March 10, 1970 R. C. HELDENBRAND 3,499,631
CORRAL CONSTRUCTION
Filed Nov. 29, 1968 2 Sheets-Sheet 1
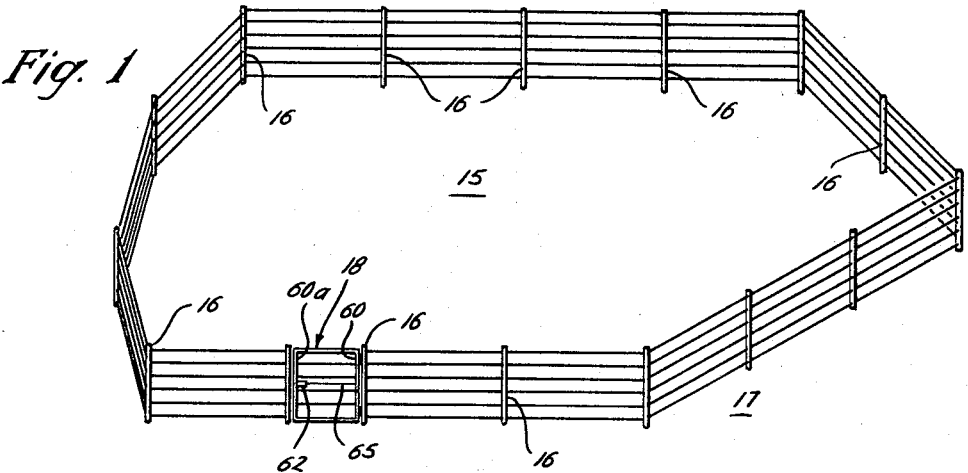
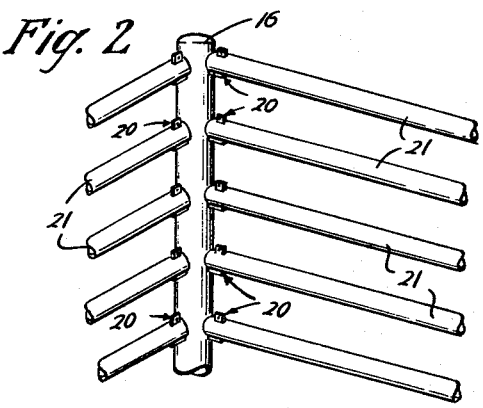
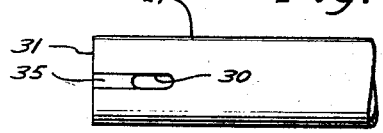
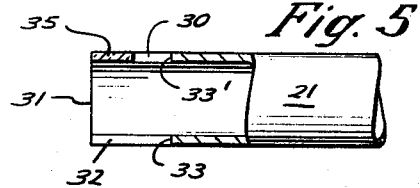
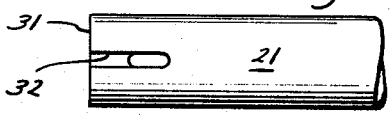
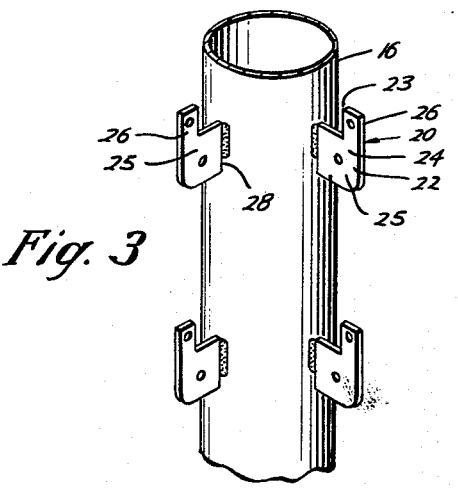
Russell C. Heldenbrand
INVENTOR
BY
Hayden Pravel Wilson & Matthews
ATTORNEYS

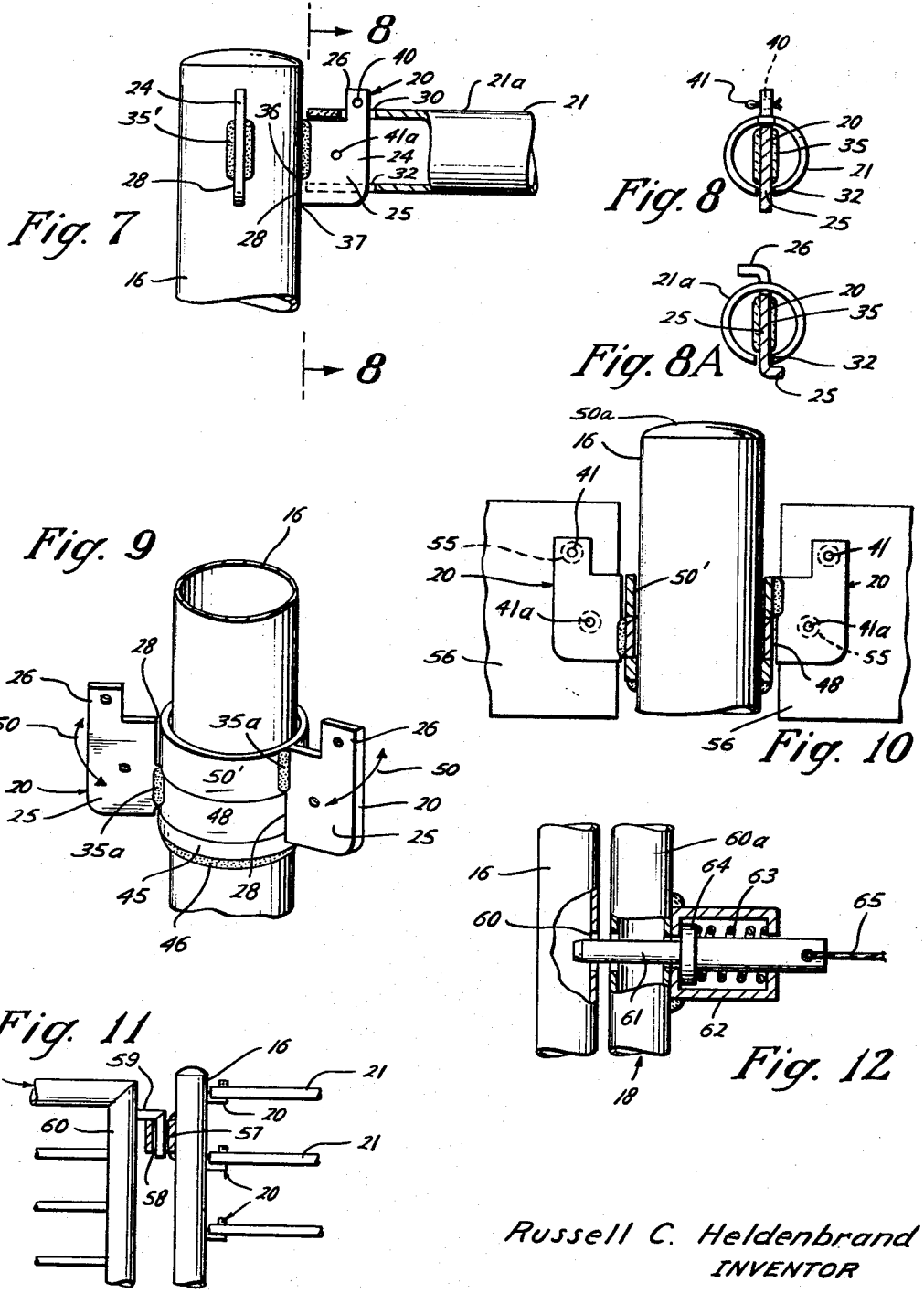

United States Patent Office 3,499,631
Patented Mar. 10, 1970

3,499,631
CORRAL CONSTRUCTION
Russell C. Heldenbrand, P.O. Box 178,
New Iberia, La. 70560
Filed Nov. 29, 1968, Ser. No. 780,031
Int. Cl. E04h 17/16, 17/14
U.S. Cl. 256—25
10 Claims

ABSTRACT OF THE DISCLOSURE

A corral construction for animals wherein the posts can be positioned to define an area forming a corral, and wherein rail support means are provided for carrying, or securing to the posts, the rail support means having portions which fit within slots formed in the tubular rails whereby the rails may be positioned between the posts in a desired angular relationship to form a corral of any desired size and shape. A gate is pivotally secured to one of the posts and is provided with spring-loaded plunger latch means for fitting within an adjacent post whereby the gate may be secured to the adjacent post by engaging the plunger within the opening to close the corral, or the plunger may be removed from the opening in the adjacent post, so that access may be gained to the corral.

BACKGROUND OF THE INVENTION

Field of the invention

The present invention relates to corrals for animals such as cattle, horses and the like.

Description of the prior art

Applicant is not aware of any specific prior art, although there may be some, but applicant is aware of various devices which have been offered heretofore commercially for use as corrals. It can be appreciated that corrals should be designed to withstand a shock or impact of animals weighing as much as a ton or more, and generally speaking, applicant is unfamiliar with any corral which can readily be adapted to various areas and shapes, and which is constructed so as to withstand the battering and impact or shock of animals bumping or running thereagainst.

Additionally, applicant is not familiar with any corrals wherein the configuration or shape of the corral can be altered or varied as circumstances and time may require, merely by providing additional posts and rail supports thereon and securing the rails on the rail supports.

SUMMARY OF THE INVENTION

The construction and arrangement of the rail supports of the present invention enables the rails to be removed, if desired, to accommodate a relocation or rearrangement of the corral.

One object of the present invention is to provide in a corral a rail support of novel configuration, which can be supported on the corral post in one of several ways, and which is constructed so as to aid in forming a latch or locking means to releasably secure the rail in position on the post.

Still another object of the present invention is to provide a corral construction wherein the corral can be constructed on the site desired and the rail supports positioned at a desired angular relationship relative to the vertical-longitudinal axis of the posts so that the rails in turn may be supported at any desired angular relationship relative to the posts whereby a corral of any desired contour or configuration may be formed. Other objects and advantages of the present invention will become apparent from a consideration of the following description and drawings.

BRIEF DESCRIPTION OF THE DRAWINGS

FIG. 1 is a perspective view illustrating one shape of corral which may be formed with the present invention;

FIG. 2 is a perspective view illustrating the upper portion of one of the vertical posts and one form of rail support, secured thereto and the vertical alignment thereof in rows, with rails positioned on each row of rail supports at a predetermined angular relationship;

FIG. 3 is an enlarged partial isometric view showing a portion of the post of FIG. 2 and the form of rail supports provided thereon;

FIG. 4 is a top plan view showing one end of the rail wherein a slot is provided adjacent but spaced from the end of the rail. It can be appreciated that the other end of the rail is provided with a similar slot adjacent but spaced therefrom;

FIG. 5 is a sectional view, partially in elevation, illustrating the first slot referred to in FIG. 4 as well as a second slot diametrically opposed thereto, and extending along the longitudinal axis of the tubular rail and terminating approximately where the first slot terminates. It can be appreciated that the other end of the rail is similarly constructed;

FIG. 6 is a bottom plan view of the rail shown in FIG. 5. The other end of the tubular rail is similarly constructed;

FIG. 7 is an enlarged side view of a portion of the upper end of a vertical tubular post and illustrates the L-shaped flat plate members secured thereto in substantially horizontal alignment with one edge of the L-shaped plate member abutted against the vertical post and welded for a distance therealong;

FIG. 8 is a view on the line 8—8 of FIG. 7 showing the manner in which the tubular rail is received on the L-shaped plate member, as well as a means for latching the rail on the rail support;

FIG. 8A is a view similar to FIG. 1, but illustrating the manner in which the L-shaped rail support may be bent above and below the tubular rail respectively, to form a latch or lock means to hold the rail in position on the vertical post;

FIG. 9 is a partial isometric view of a vertical post showing another form of supporting the rail supports on the vertical posts wherein a ring is welded to the vertical post and the rail supports are in turn welded to additional rings, which additional rings abut the ring and each other in order to provide horizontal alignment of the tubular rails when they are positioned thereon;

FIG. 10 is a side view of the upper end of a post illustrating another form of rails on the rail supports;

FIG. 11 is a side view of the upper pivot means for pivotally supporting a gate adjacent a post. It can be appreciated that while only the upper portion is shown, at least one additional pivot means can be provided on a vertical post for pivotally supporting a gate thereon; and FIGURE 12 is a side view, partially in section, showing a spring-loaded plunger arrangement mounted in a vertical brace of the gate which plunger is adapted to be received within an opening in an adjacent vertical post for latching the gate against any entry into the corral, and for permitting access to the corral by removing the plunger from the opening of the adjacent post.

DESCRIPTION OF THE PREFERRED EMBODIMENTS

In FIG. 1, the corral of the present invention is shown, for purposes of illustration only, in a particular configuration. It will be noted that the area enclosed, represented by the number 15 by the corral of the present invention is determined by arranging a plurality of vertical tubular posts 16 which are positioned at spaced intervals in the earth 17 to define the area 15 to be enclosed. It can be appreciated that the vertical posts 16 can be set in cement to provide additional rigidity and strength to the structure. Also, the posts, 16, can be arranged in any suitable relationship to define any specific area or configuration to be enclosed. It will be noted that a gate means referred to generally by the numeral 18 is provided between two of the posts 16 which are suitably spaced for receiving the gate 18 therebetween.

In FIG. 2, a portion of a post 16 is shown and mounted at vertically spaced intervals, and referred to generally by the number 20 are rail support means for receiving the tubular rails 21 and supporting them in relation to the posts 16. The vertical spacing of the rail supports 20 on the posts 16 will depend upon the number of rails it is desired to extend between the posts 16, and this in turn is dependent upon the type of animal which is to be enclosed within the corral.

It will be noted that, as shown in FIG. 2, there are two vertical rows of rail supports 20, and that they are arranged at substantially ninety degrees in relation to each other. It can be appreciated that if so desired, other rows of rail supports could be provided upon the vertical posts 16 if additional enclosures or pens are desired. Attention is directed to FIG. 3, wherein the vertical tubular post 16 is again illustrated with the rail supports 20 being shown in greater detail. It will be noted that the rail supports 20 include a flat plate member 22 which has a notch 23 cut therein, which forms a generally L-shaped member 24, to form a base 25 and vertical leg 26 extending upwardly from the base 25.

It will be noted that the base 25 of the L-shaped member 24 is wider than the vertical leg and that the base 25 is provided with an edge 28 for facing toward or abutting the post 16 whereby it may be secured thereto, in the form of the invention described in FIGURES 1 through 7.

FIGURES 4, 5 and 6 illustrate in greater detail one end of a tubular rail 21, and it can be appreciated that the other end of the tubular rail 21 is similarly constructed. Each tubular rail is provided with a first slot 30 which is adjacent, but spaced from, the nearest end 31 of the rail 21, and extends along the longitudinal axis of the tubular rail. The slot or opening 30 may be formed in the tubular rail in any suitable manner, and as shown in FIGURE 5, such slot 30 is formed by first forming the slot 30 and the second slot 32 which extends from the end 31, and is diametrically opposed to the slot 30, and extends along the longitudinal axis of the rail 21 to terminate as illustrated at 33, adjacent the termination of the slot 30 as shown at 33'. Thereafter, a suitable weld as illustrated at 35 can be provided from the end 31 of the tubular rail 21 a suitable distance for forming the slot or opening 30.

FIGURE 4 is a top plan view showing the weld 35 and the opening 30 within the tubular rail 21; FIGURE 5 is a side view partly in elevation and partly in section, to more clearly illustrate the diametrical arrangement of the slot 30 and the slot 32; and FIGURE 6 is a bottom plan view of the tubular rail 21, showing the slot 32 which extends from the end 31 of the tubular rail 21 to generally or preferably terminate coincident with the termination of the opening 30.

Referring to FIGURE 7, the vertical post 16 is illustrated, only the upper end being shown in such view, and secured thereto at substantially ninety degree angles are a pair of the L-shaped rail supports 24. It will be noted that in the form of the invention shown and described in FIGURES 1 through 7, the edge 28 of the base 25 which abuts against the outer periphery of the vertical posts 16 can be secured on the vertical posts 16 in any suitable manner, and preferably by welding as illustrated at 35'.

It also will be noted that in the form of the invention described in FIGURES 1 through 7, the weld extends only a portion of the distance along the edge 28, and as shown, extends from the upper end of such edge, towards the lower end 37, but terminates at a point 36 spaced from the lower end 37 of the edge 28. Thus, the tubular rail 21 can be positioned on the rail support 20 by inserting the vertical leg 26 through the slot or opening 30 and the base 25 is telescopically received within the end of the tubular member, as illustrated in FIGURE 7 of the drawings.

It will also be noted that the extent of the leg 26 is such that it will project above the surface 21a of the tubular rail 21 and the extent of the base 25 is such that it will project through the slot 32 beyond the surface 21a of the tubular member 21. It will be noted that the weld 35' extends along the edge 28, a suitable distance to firmly secure the rail support 21 to the vertical post 16, but so as to not interfere with the telescoping relationship of the rail 21 on the rail support 20, as shown in FIGURE 7 of the drawings.

It is preferable to lock or latch the rail 21 on its respective rail support 20, and to this end there is provided at least one opening 40 in the rail supports 20 and, as illustrated in FIGURE 7, the opening 40 is in the portion of the leg 26, which projects above the outer surface 21a of the tubular rail 21. As shown in FIGURE 8, a pin or cotter key 41 can then be positioned through the opening 40 to lock or retain the tubular member 21 in position on the rail support.

FIGURE 8a illustrates another means whereby the tubular rail 21 may be retained in position on the rail support 20, such means being accomplished by bending the portion of the vertical leg 26 which projects above the surface 21a over at substantially right angles relative to the portion of the base 25 which is welded to the vertical post 16. Similarly, the portion of the base projecting through the slot 32 can be bent over at substantially right angles whereby the rail 21 is locked or retained in position on the rail support 20.

In FIGURES 1 through 7, it is contemplated that the rail support 20 will be secured in vertically aligned rows on the tubular vertical post 16, and that the rows will be spaced in an angular relationship as desired. This may be done at the site where the corral is to be installed, or if the shape and configuration of the corral is known in advance, it may be done prior to the time that the post, rails and rail supports are taken to the site for the corral.

As previously mentioned, if more than two rows of rail support members 20 are desired, they may be welded to th vertical posts 16 in any spaced angular relationship as desired.

However, in some circumstances, it may be that the exact angular relationship of the vertical rows of rail supports 20 is not known in advance, and is to be determined by the ultimate user, or, it may be that the arrangement of the corral may change or be varied over a period of time. In this event, the arrangement as illustrated in FIGURE 9 of the drawings may be employed for supporting the rail supports referred to again by the numeral 20 on the vertically extending posts 16. It will be noted that a support ring 45 is secured to the vertically extending posts 16 by any suitable means such as the weld 46, and that independent rings 48 and 50' are telescopically and slidably received on the posts 16, and as shown in FIGURE 9, one of the rings bears on the support ring 46 and the other ring 50' is in turn supported by the ring 48. As shown in FIGURES 1 through 7, and described herein, it is preferable that the horizontally extending rails 21 extend in substantially the same horizontal plane and, as previously noted with regard to the FIGS. 1 through 7 modification, the rail supports 20 are arranged in vertical rows, and are arranged in the same horizontal planes, so that the rails 21 will in turn be supported in substantially the same horizontal planes.

This is accomplished in the FIGURE 9 modification, wherein the rail support 20 again includes a base 25 and a vertical leg 26, the base having an edge 28 adapted to be disposed toward the vertical posts 16; however, since the rail supports 20 are to be mounted on the rings 48 and 50', the edge 28 is abutted against its respective ring, and a weld 35a applied thereto. In order to maintain the horizontal alignment of the rails 21 when they are positioned on the rail supports 20, it will be noted that in FIGURE 9, the lower portion of the edge 28 of the base 25 is welded to the ring 48, whereas the upper portion of the edge 28 of the other rail support 20 is welded to the ring 50' so that, in effect, the rail supports 20 are in the same horizontal plane to receive a tubular rail member thereon.

It can be appreciated that the rail supports 20, as shown in the modification of FIG. 9, can be rotated about the vertical axis of the post 16 to any desired angular relationship to accommodate the rail in position thereon, and in proper angular alignment with the next adjacent vertical post. The angular movement of the rail supports 20 is represented by the arrows 50, in FIG. 9.

It can be appreciated that after each ring 45 is welded in position on the vertical support 16, at least one or more of the rail supports 20 can be positioned on its respective support ring which is in turn carried on the support ring 45, depending on the configuration of the corral and number of pens desired. After each ring support 45 is welded in position on the vertical posts 16, the support rings for the desired number of rail supports 20 are slipped on the vertical posts and thereafter the next adjacent support ring 45 is welded in position at a spaced vertical distance relative to the one illustrated in FIGURE 9 of the drawings.

In FIGURE 10 of the drawings, the upper end of the vertical posts 16 is again shown, and as illustrated, it is closed off by any suitable closure means as illustrated by number 50a.

It will be noted that in the form of the rail support 20 illustrated in the FIGURES 1 through 7, in addition to the opening 40 in the leg 26, there is also provided an opening 41a. Similarly, in FIGURE 10, rail supports 20 which are carried by the rings 48 and 50 are provided with openings 41 and 41a respectively. In some situations it may be desirable to secure wooden members to the rail supports 20 and in such event, nails or other suitable means as illustrated in dotted line at 55, can be positioned in each of the openings 41 and 41a respectively to secure the wooden members 56 in position thereon.

Referring again to FIGURE 1, a gate is illustrated at 18 which is formed in a generally rectangular configuration of suitable size to fit between the spaced vertical posts 16.

FIGURE 11 illustrates the vertical post 16 and a bracket 57 secured thereto with an opening 58 therein, for receiving the L-shaped member 59 that is welded to the vertically extending main brace 60 of the gate 18.

At least one other brace 57 and L-shaped member 59 is provided on the post 16 and vertically extending position 60 of the gate 18 to pivotally mount the gate 18 in position on the post 16.

In order to retain the gate locked, the adjacent, spaced vertical post 16 is provided with an opening 60 for receiving the plunger 61 which extends through the housing 62 mounted on the other main vertical brace 60a of the gate 18. A spring 63 is carried by the housing 62 and abuts the annular shoulder formed on the plunger 61 to urge it into the opening 60. A cable means 65 extends from the end of the plunger 61 and is secured by any suitable means to the main vertical brace 60 of the gate 18, whereby the plunger may be manually withdrawn from the opening 60 of the post 16 for gaining access to the corral.

From the foregoing description, it can be appreciated that the present invention provides a corral construction wherein the vertical posts may be positioned in the ground by placing them in concrete or by driving them into the ground. The vertical posts 16 can be positioned in spaced relationship to each other and can be arranged to define the contour of the corral desired. The rail supports 20 may be secured to the vertical posts 16 prior to the time that they are set in concrete, or may be secured to the vertical posts 16 after the posts have been positioned in the earth 17. Thereafter, the rails 21 can be positioned on the supports by dropping the rail over the vertical leg 26 so that it extends upwardly through the opening 30 with the base 25 being telescopically received within the tubular member by means of the slot 32 and depending from the surface 21a of the tubular member 21 as described with regard to FIGURE 7.

In those situations where desired, the form of the invention illustrated in FIGURE 9 may be employed to enable adjustment of the rail supports 20 to a predetermined angle at the site of the corral.

The foregoing disclosure and description of the invention is illustrative and explanatory thereof and various changes in the size, shape, and materials, as well as in the details of the illustrated construction, may be made within the scope of the appended claims without departing from the spirit of the invention.

What is claimed is:
1. A corral construction for animals comprising:
 (a) vertical tubular posts positioned in the earth at spaced intervals to define an area to be enclosed for forming a corral;
 (b) rail supports for securing at vertically spaced intervals on said posts, said rail supports including:
  (1) a flat plate member having a notch cut therein to form a generally L-shaped member forming a base and vertical leg;
  (2) the base of said L-shaped member being wider than the vertical leg and said base having an edge for facing toward said post and secured thereto;
 (c) tubular rails extending between said vertical tubular posts and secured therewith by said rail supports, said rails having a first slot adjacent, but spaced from one end of said rail and extending along the longitudinal axis of said rail and receiving said vertical leg of said L-shaped member therethrough and having a second slot which is diametrically opposed to said first slot, and said second slot extending from said one end of said rail and along the longitudinal axis thereof to the termination of said first slot and telescopically receiving said base of said L-shaped member within said rail; and
 (d) means for latching said rail on said L-shaped member.

2. The invention of claim 1 wherein the height of said L-shaped member is greater than the diameter of the rail to be supported thereby so that the vertical leg of said L-shaped member projects through said first slot and beyond said rail and said base projects through said second slot and beyond said rail.

3. The invention of claim 1 wherein said edge of said base of said L-shaped member which faces toward said post is secured thereto by welding.

4. The invention of claim 2 wherein said edge of said base of said L-shaped member which faces toward said post is secured thereto by welding, and wherein the weld extends only partially along said edge and terminates at a point spaced from the bottom edge of said base of said L-shaped member.

5. The invention of claim 4 wherein said latch means is formed by bending the projecting vertical leg portion and projecting base portion of said L-shaped member to retain said rail on said rail support.

6. The invention of claim 4 wherein said latch means is formed by bending the projecting base portion of said L-shaped member to retain said rail on said rail support.

7. The invention of claim 4 wherein at least one opening is provided in said vertical leg at a position so that the opening will be exposed above the rail when the rail is positioned in said rail support and wherein said latch means includes pin means for fitting in the opening to retain said rail on said rail support.

8. The invention of claim 1 wherein the corral includes gate means, pivot means for securing said gate means to one of said vertical posts, and spring loaded plunger latch means carried by said gate for engaging said plunger within an opening in an adjacent vertical post whereby said gate may be latched to said adjacent post and opened by actuating said spring loaded latch means to release it from said opening in said adjacent post for access to the corral.

9. The invention of claim 1 including:
   (a) rings welded to said vertical posts at vertically spaced intervals therealong;
   (b) additional rings fitting on said posts and bearing against said rings welded thereon;
   (c) said edge of said base of one of said L-shaped members being welded to said one of said additional rings whereby said additional rings may be rotated on said posts to enable said rails to be aligned at any desired angle relative to said posts.

10. The invention of claim 1 wherein said rail supports are provided with more than one opening whereby a wooden rail may be secured to said rail support by nails or similar engaging means extending through said openings and into the rail.

References Cited
UNITED STATES PATENTS

| | | | |
|---|---|---|---|
| 54,794 | 5/1866 | Thompson | 256—26 |
| 199,211 | 1/1878 | Kirk | 256—24 |
| 1,228,717 | 6/1917 | Tataryn | 256—59 |
| 1,506,502 | 8/1924 | Rheinberger | 256—25 |
| 2,775,473 | 12/1956 | Brewer | 256—68 X |
| 3,136,530 | 6/1964 | Case | 256—24 |

FOREIGN PATENTS

| | | |
|---|---|---|
| 679,297 | 9/1952 | Great Britain. |
| 907,632 | 10/1962 | Great Britain. |

DENNIS L. TAYLOR, Primary Examiner

U.S. Cl. X.R.

256—59